United States Patent
Phillips

(10) Patent No.: US 6,748,195 B1
(45) Date of Patent: Jun. 8, 2004

(54) WIRELESS DEVICE HAVING CONTEXT-BASED OPERATIONAL BEHAVIOR

(75) Inventor: W. Garland Phillips, Arlington, TX (US)

(73) Assignee: Motorola, Inc., Schaumburg, IL (US)

( * ) Notice: Subject to any disclaimer, the term of this patent is extended or adjusted under 35 U.S.C. 154(b) by 528 days.

(21) Appl. No.: 09/675,807

(22) Filed: Sep. 29, 2000

(51) Int. Cl.$^7$ ................................................ H04M 1/100
(52) U.S. Cl. ..................... 455/41.2; 455/456.3; 370/338
(58) Field of Search ..................... 455/456.5, 456.3, 455/435.3, 41.2, 41.3, 414.2, 414.4, 553.1, 410, 550.1, 552.1, 556.2; 370/338, 337, 254, 255, 351

(56) References Cited

U.S. PATENT DOCUMENTS

| | | | |
|---|---|---|---|
| 5,781,628 A | * 7/1998 | Alperovich et al. | ........ 380/258 |
| 5,903,832 A | * 5/1999 | Seppanen et al. | ........ 455/435.3 |
| 6,233,448 B1 | * 5/2001 | Alperovich et al. | ........ 455/417 |
| 6,356,772 B1 | * 3/2002 | Choi | ........................ 455/564 |
| 6,470,447 B1 | * 10/2002 | Lambert et al. | ............ 713/151 |

\* cited by examiner

Primary Examiner—Nick Corsaro
(74) Attorney, Agent, or Firm—Charles W. Bethards; Hisashi D. Watanabe

(57) ABSTRACT

A wireless device uses profiles associated with one or more contexts, which defines various operating situations. Depending on a context, the wireless device changes its operational behavior in accordance with a defined profile, when a context parameter changes. Among other things, the context can correspond to a wireless device location, user age, skill, or gender, or ambient environmental factors, such as temperature. For example, based on a profile associated with a location, the wireless device can change its operational behavior relative to sharing resources with other devices.

14 Claims, 3 Drawing Sheets

| LOCATION | PROFILE |
|---|---|
| HOME | PROFILE A |
| OFFICE | PROFILE B |
| HEAD OFFICE | PROFILE B |
| ELSEWHERE | PROFILE C |
| | |
| | |
| | |
| | |
| | |

FIG. 5

PROFILE A

| PARAMETER | VALUE |
|---|---|
| CONNECTABLE | ON |
| DISCOVERABLE | ON |
| AUTO RESPOND | ON |
| DATA SHARING | OFF |
| SEEK OTHERS | OFF |
| RESPOND PRINTERS | OFF |
| RESPOND NETWORKS | ON |
| RESPOND PEERS | ON |
| PAIRABLE | ON |
| SECURITY | MODE 2 |

FIG. 6

PROFILE B

| PARAMETER | VALUE |
|---|---|
| CONNECTABLE | ON |
| DISCOVERABLE | ON |
| AUTO RESPOND | ON |
| DATA SHARING | OFF |
| SEEK OTHERS | ON |
| RESPOND PRINTERS | ON |
| RESPOND NETWORKS | ON |
| RESPOND PEERS | ON |
| PAIRABLE | ON |
| SECURITY | MODE 1 |

FIG. 7

PROFILE C

| PARAMETER | VALUE |
|---|---|
| | |
| AUTO RESPOND | OFF |
| DATA SHARING | OFF |
| SEEK OTHERS | OFF |
| RESPOND PRINTERS | OFF |
| RESPOND NETWORKS | OFF |
| RESPOND PEERS | OFF |
| TRANSMITTER | OFF |
| | |

FIG. 8

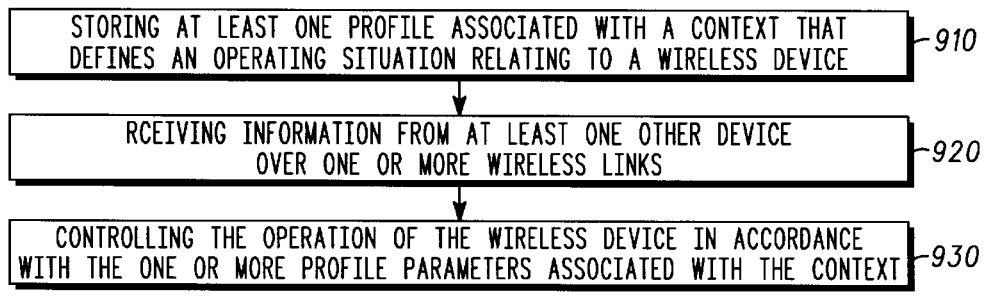

FIG. 9

WIRELESS DEVICE HAVING CONTEXT-BASED OPERATIONAL BEHAVIOR

FIELD OF THE INVENTION

In general, the present invention relates to the field of communications, more particularly, to communication systems that provide communication services to wireless devices.

BACKGROUND OF THE INVENTION

Communication systems that provide services or shared resources over wireless links are known. One such system is specified by Bluetooth that supports both asynchronous and isochronous services, where the services are offered to the wireless devices over point-to-point or point-to-multipoint communication links. Bluetooth technology allows for the replacement of the many proprietary cables that connect one device to another with one universal short-range radio link. For instance, Bluetooth radio technology built into both the cellular telephone and the laptop would replace the cumbersome cables used today to connect laptops to cellular telephones. Printers, PDA's, desktops, fax machines, keyboards, and joysticks, for example, can be part of the Bluetooth system. But beyond untethering devices by replacing the cables, Bluetooth radio technology may provide a bridge to existing data networks, a peripheral interface, and a mechanism to form small private ad hoc groupings of connected devices away from fixed network infrastructures.

Under Bluetooth specification, a Service Discovery Protocol (SDP) defines the procedure for locating available services or shared resources, for example, printers. More specifically, SDP provides the means for client applications, which may be running on the wireless devices, to discover the existence of services or shared resources provided by server applications as well as the attributes of those services or resources. The attributes, of a service or resource, include the type or class of service offered and the mechanism or protocol information needed to utilize the service.

In order to provide point-to-point or point-to-multipoint communication links, Bluetooth uses a combination of circuit and packet switching. A point-to-point link is shared between only two Bluetooth-enabled wireless devices, whereas a point-to-multipoint link is shared among several wireless devices. Bluetooth can support one asynchronous data channel, up to three simultaneous synchronous voice channels, or a channel that simultaneously supports asynchronous data and synchronous voice.

Under the Bluetooth specification, two or more wireless devices that share the same channel form a piconet, and multiple piconets with overlapping coverage areas form a scatternet. One wireless device acts as the master device of the piconet, whereas the other wireless device(s) acts as slave device(s). Thus, each piconet can only have a single master device. However, slave devices can participate in different piconets on a time-division multiplex basis. In addition, a master device in one piconet can be a slave device in another piconet.

Communication resources of the Bluetooth system can support up to seven active slave devices in a piconet. Because Bluetooth system has a limited capacity to provide access to communication services over its supported links, the system allows some of the slave devices to remain locked to the master device in a so-called "parked" state. The parked slave devices cannot be active on the channel, but remain synchronized to the master device. Both for active and parked slave devices, the channel access is controlled by the master device. Under this arrangement, once a communication resource of the system becomes available, a parked wireless device is activated to access a requested service. However, until activated, this arrangement deprives the parked wireless devices from enjoying the benefits of the provided services.

In the above mentioned conventional or known systems, the wireless devices access services or share resources without taking into consideration the surrounding context within which they are required to operate. Known computer systems for example allow users to boot in different modes depending on whether they are using a dialup connection or LAN. Also known is a pager that displays different news depending on its location. For example, such a system may not allow users to receive sports stories while they are at work.

When a large number of in-range devices communicate with each other on an ad-hoc basis, the system or devices that support such communication may become overwhelmed with allocating the resources required to communicate with the large number of devices. Thus, there exists a need for a system that allows for operating the wireless devices in a manner that optimally uses the available resources in accordance with an operating situation.

BRIEF DESCRIPTION OF THE DRAWINGS

FIG. 5 shows a table associating various locations with corresponding profiles.

FIGS. 6–8 show tables depicting profile parameters for three exemplary profiles.

FIG. 9 is a flow chart of a communication method between two wireless devices over one or more wireless links in accordance with the present invention.

DETAILED DESCRIPTION OF THE PREFERRED EMBODIMENT

In accordance with the invention, a wireless device uses profiles that are associated with one or more contexts. The contexts can define various situations under which the wireless device operates. Depending on a context, the wireless device changes its operational behavior in accordance with a defined profile, for example, when a context parameter changes. Among other things, the context can correspond to a wireless device location, user age, skill, or gender, or even ambient environmental factors, such as temperature. For example, based on a profile associated with a location, the wireless device can change its operational behavior relative to sharing resources with other devices. Other contexts could include wireless network connectivity capability, ID and type of "communicated to" device.

The profile associated with a context can have one or more parameters that define the operational behavior of the wireless device in terms of one or more operating modes of the wireless device. The operating modes of the wireless device can relate to its discoverability, connectability, pairing, security, and idle modes, among other things. For example, a parameter can correspond to an auto respond parameter, whereby the wireless device can automatically respond to requests, without user interaction. Alternatively, the parameter can relate to data sharing, allowing other devices to access data stored in the wireless device. Other parameters can relate to seeking other devices, responding to printers, network devices, or peer devices.

More specifically, the wireless device of the present invention includes a receiver and transmitter that communicate information with other devices over the wireless links. In this way, the wireless device can allow access to its own resources, e.g., shared data, or to the resources offered by the other devices. A storage device stores the profiles and their associated parameters. A controller, that has access to the profile parameters, changes the operation behavior of the wireless device in accordance with a profile.

Figure 1:
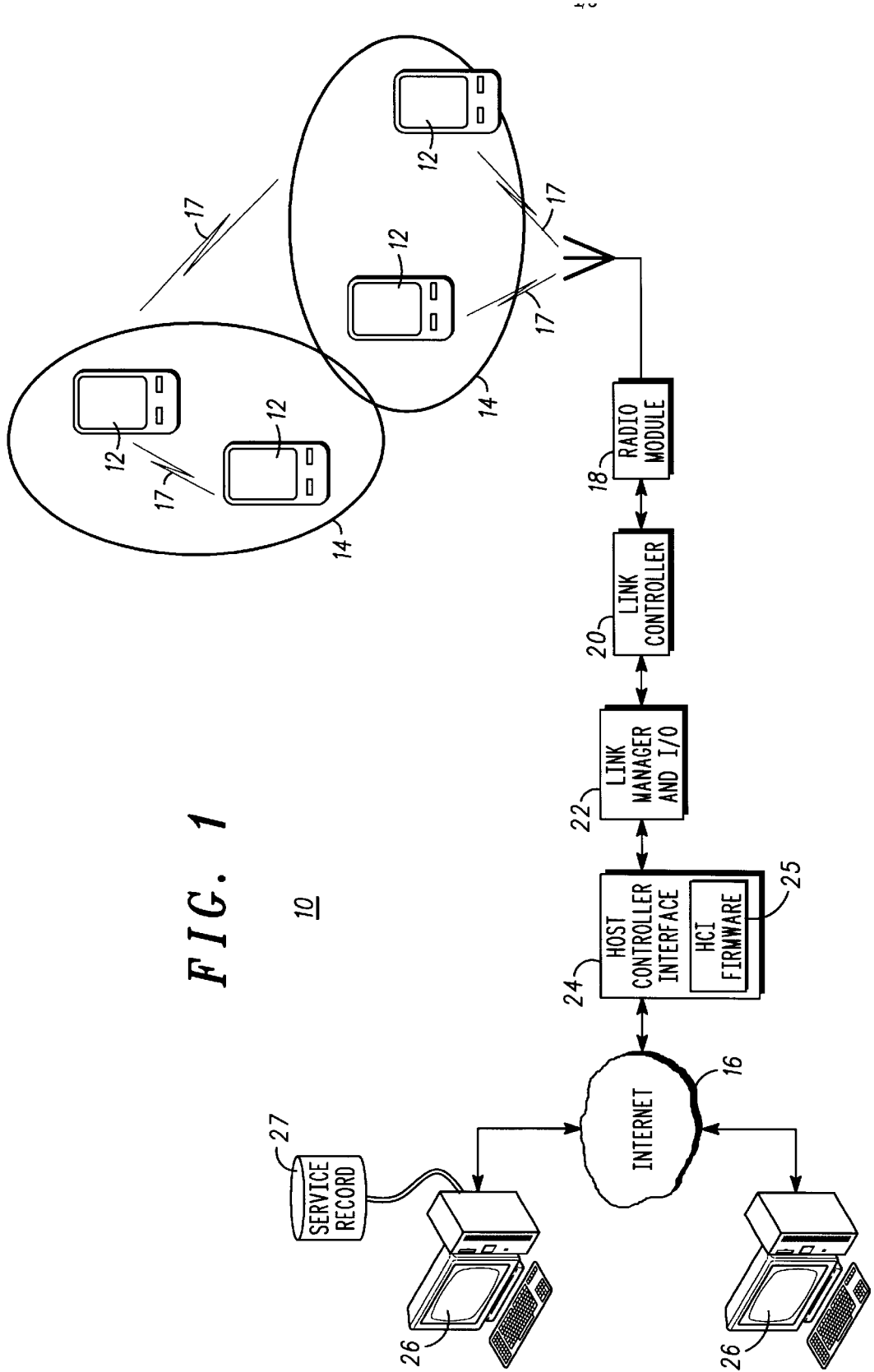
FIG. 1 shows a block diagram of an exemplary system that may operate in accordance with the present invention.

Referring to FIG. 1, a system 10 that advantageously implements the present invention is shown. The system 10 is preferably implemented over a communications network that provides wireless links for one or more wireless devices 12 that operate within one or more coverage areas 14. A wired communications link can also be provided over the Internet 16, which is a collection of interconnected (public and/or private) networks that are linked together by a set of standard protocols (such as WAP, or TCP/IP) to form a global, distributed network. Various wireless links 17 that support defined protocols may be used in connection with the present invention. Examples of such protocols include those defined by Bluetooth, IEEE 802.11, GSM, IS-136, and IS-95, iDEN, etc.

In the preferred embodiment, the system 10 is implemented based on the Bluetooth System, as disclosed in Specification of the Bluetooth System (v1.B Dec. $1^{st}$1999), which is hereby incorporated by reference. Although Bluetooth is well understood the operation of one such system is described to the extent necessary to enable one of ordinary skill in the art to make and use the present invention.

The Bluetooth specification defines generic procedures related to discovery of Bluetooth devices under two mode procedures: "idle mode" procedures and "connecting mode" procedure, which relates to link management aspects of connecting to Bluetooth devices. It also defines procedures related to the use of different security levels and includes common format requirements for parameters accessible on a user interface level. Also, the specification defines the features and procedures for an application in a Bluetooth device to discover services registered in other Bluetooth devices and retrieve any desired available information pertinent to these services.

Generally, a Bluetooth system provides short-range radio links over an unlicensed ISM band within which information is communicated using shaped binary frequency modulation to provide an information symbol rate of 1 Ms/s. The Bluetooth system uses slotted channels in the form of time slots. On each channel, information is exchanged through packets that are transmitted on different hopping frequencies. A packet nominally covers a single slot, but can be extended to cover up to five slots.

As shown in FIG. 1, the system 10 consists of a radio module 18, a link controller 20, and a link manager 22 that interfaces with a host controller interface (HCI) 24. The radio module 18 operates in the 2.4 GHz band to provide the physical medium over which wireless devices 12 communicate with the system 10. The band has a 83.5 MHz width that contains 79 RF channels that are spaced 1 MHz apart from each other. Each channel is represented by a pseudo-random hopping sequence through the 79 RF channels. The hopping sequence is unique for each piconet and is determined by the device address of a corresponding master device, with the clock of the master device setting the phase in the hopping sequence.

The link controller 20 carries out the baseband protocols and other low-level link routines and includes hardware and software parts that perform baseband processing and manage physical layer protocols as well as ARQ-protocol and FEC coding. The link controller 20 controls two types of links: Synchronous Connection-Oriented (SCO) links, and Asynchronous Connection-Less (ACL) links. The SCO link, which typically supports time-bounded information like voice, is a point-to-point link between a master device and a single slave device in a piconet. A master device can maintain up to three SCO links to the same slave device or to different slave devices using reserved slots at regular intervals that form circuit-switched like connections. A slave device can support up to three SCO links from the same master device or two SCO links if the links originate from different master devices. Because SCOs are synchronous links, they do not support packet transmissions.

In contrast, the ACL link is a point-to-multipoint link that supports packet transmissions. An ACL link is established between a master device and all slave devices that participate on a piconet. In the slots not reserved for the SCO link(s), the master device can establish an ACL link on a per-slot basis to any slave device, including the slave device(s) already engaged in an SCO link. Between a master device and a slave device, however, only a single ACL link can exist. ACL packets not addressed to a specific slave device are considered as broadcast packets and are read by every slave device.

The Host Controller Interface (HCI) 24 provides a command interface to the link manager 22, and access to hardware status and control registers. Using an HCI firmware 25, this interface provides a uniform method of accessing the baseband capabilities. The HCI firmware 25 implements the HCI commands for the system hardware by accessing baseband commands, link manager commands, hardware status registers, control registers, and event registers.

A host processor 26 coupled to a database 27 (one depicted) including service records, utilizes link policy commands controlled by the HCI 24 to manage traffic in a localized network. The host processor 26 can be owned and maintained by a service provider. The localized networks can be, for example, a Bluetooth piconet, and/or scatternet. Other examples of localized networks that can advantageously utilize the present invention include those specified by IEEE, under standard 802.11, which is hereby incorporated by reference. Several layers may exist between an HCI driver on the host processor 26 and the HCI firmware 25 in the system hardware. These intermediate layers, generally known as the Host Controller Transport Layer, provide the ability to transfer data without intimate knowledge of the data. HCI events are used for notifying the host processor 26 when something occurs. Once the host processor discovers that an event has occurred, it parses the received event packet to determine the nature of the event. For example, the host processor 26 uses the HCI events to detect a service request that is generated by a wireless device 12.

Figure 2:
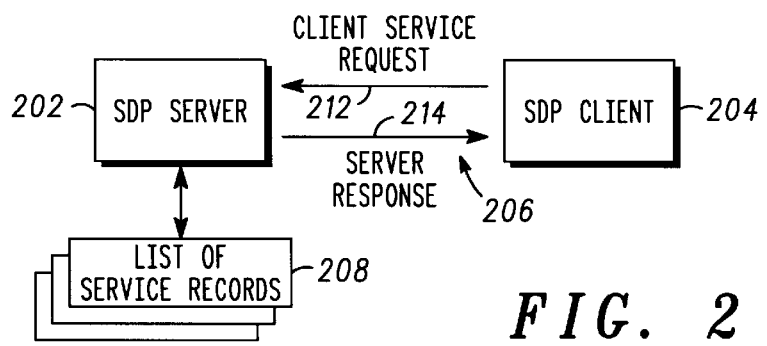
FIG. 2 shows a block diagram of a Service Discovery Protocol (SDP) that is used in the system of FIG. 1.

Referring to FIG. 2, a block diagram at an application level for supporting a Service Discovery Protocol (SDP) in the system of FIG. 1 is depicted. The SDP defines the protocol for locating available services provided by or available through a service provider. The SDP provides for discovery of a server application and the attributes of those services contained in service records by a client application. For providing services in accordance with this embodiment of the invention, a SDP server 202, typically running on a host processor 26, and a mobile SDP client application 204, typically running on a mobile device 12, communicate with each other.

The SDP server 202 maintains a list of service records 208 that uniquely describe the characteristics of the services associated with the server. In this way, a mobile client may retrieve information from the service records maintained by the SDP server by issuing an SDP request 212. In the case of an SDP Service Search request, an SDP Service Search response is returned with an SDP response 214 providing a list of all available services that meet the search pattern provided in the request. A single device may function both as an SDP server and as an SDP client. If multiple applications on a device provide services, an SDP server may act on behalf of those service providers to handle requests for information about the services that they provide. Similarly, multiple client applications may utilize an SDP client to query servers on behalf of the client applications.

The set of SDP servers that are available to an SDP client can change dynamically based on the RF proximity of the servers to the client. When a server becomes available, a potential client must be notified by a means other than SDP so that the client can use SDP to query the server about its services. Similarly, when a server leaves proximity or becomes unavailable for any reason, there is no explicit notification via the service discovery protocol. However the client may use SDP to poll the server and may infer that the server is not available if it no longer responds to requests.

Figure 3:
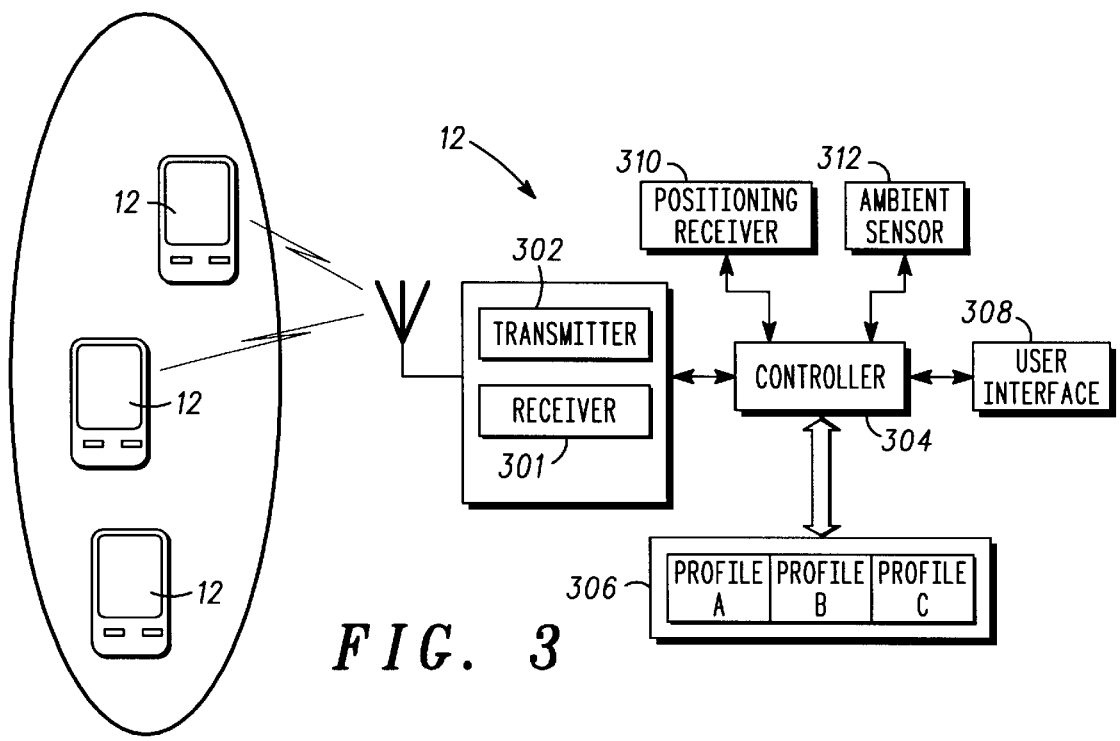
FIG. 3 shows a block diagram of a wireless device in accordance with the present invention.

Referring to FIG. 3, a block diagram of a wireless device 12 that operates in accordance with the present invention is shown. The wireless device 12 includes a receiver 301 that receives information from other devices and a transmitter 301 that transmits information to the other devices over wireless communication links. In this way, the communication of the information allows the devices, which form a piconet (or scatternet with other wireless devices), to share resources with each other. A controller 304 controls resource access within the wireless devices 12. The resources can be in the form of services that the wireless devices 12 offer to each other. Alternatively, the resources can be data that can be shared with other devices.

The wireless device 12 operates under various modes. The operation modes of the wireless 12 device relate, among other things, to its discoverability, connectability, pairing, security, resource sharing, resource seeking, responding to other devices, and idle modes. For example, the wireless device 12 can be either in a non-discoverable mode or in a discoverable mode. When the device 12 is in non-discoverable mode it does not respond to inquiries. After being made discoverable, the device 12 responds to the inquiries. Moreover, the device 12 can be either in non-connectable or in connectable modes under which it is set to respond or not to respond to paging messages. The wireless device 12 can be either in a non-pairable or pairable mode, when it accepts or does not creation of bonds initiated by another device. Under security modes, the wireless device uses authentication procedure when authentication is initiated by one device towards another, depending on if a link key exists and if pairing is allowed.

The wireless device 12 can also initiate various idle mode procedures. For example, general or limited inquiry procedures provide an initiator device with the device address, clock, Class of Device and used page scan mode of general and limited discoverable devices. A name discovery procedure can be used for retrieving a device name from a connectable device. A device discovery procedure provides the name of discoverable devices. A bonding procedure can also be used to create a relation between two devices, based on a common link key (a bond). The link key is created and exchanged (pairing) during the bonding procedure and is stored by both devices, to be used for future authentication.

According to the present invention, the wireless device 12 includes a storage device 306 that stores profiles, e.g., profiles A–C, mapped to one or more contexts that relate to the operating situations of the wireless device 12. Based on a change in a context parameter, e.g., location, the controller 304 automatically changes the wireless device's operational behavior in accordance with a profile that is associated with the changed context parameter. Each profile is a set of parameters that affect the behavior of the device 12 and its operating modes. In one exemplary embodiment, the wireless device 12 changes its behavior based on its location as determined by a positioning receiver 310 that provides the coordinates of a point or position of the device relative to bounds defined by a map. Location can also be a place designated by a user as office, home, head office, or elsewhere, for example.

In addition to device location, the context can corresponds to a wide range of other situations, for example, situations associated with the user of the device, e.g., user age, user skill, user gender, wireless network connectivity capability, ID, type of "communicated to" device, etc. Typically, a user can setup a profile configuration and assign it to be used within a context. Consequently, the wireless device 12 also includes a user interface 308, comprising an input device, e.g., keyboard, and an output device, e.g., display, for setting up the profile configuration. The context can also correspond to ambient environmental situation of the device, e.g., temperature, etc. In this way, the controller 304 can be responsive to an ambient sensor 312 that provides ambient environmental data, for changing the behavior of the wireless device, when an environment-related context parameter changes.

In accordance with another embodiment of the invention, the device 12 stores one or more preset profiles, with settings for some or all parameters. Under this arrangement, the user could choose to assign the present profiles to contexts as is or modified to suit a particular need, thereby saving the user from having to configure each parameter.

Figure 4:
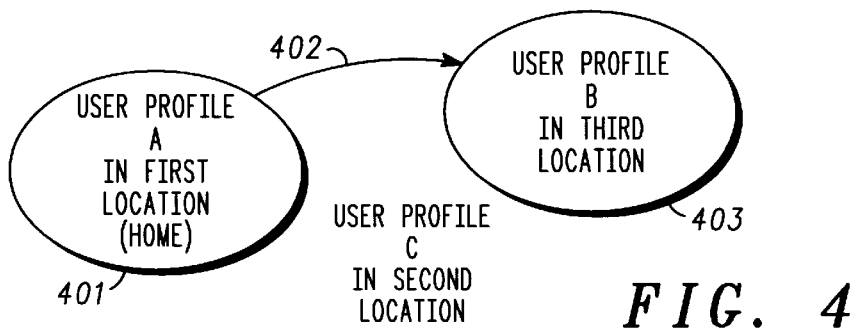
FIG. 4 shows a diagram illustrating changes in the operational behavior of the wireless device of FIG. 3 in accordance with a location based context.

Referring to FIG. 4, a diagram illustrates the exemplary embodiment of the invention as used with a location-based context, for changing the operational behavior of the wireless device in accordance with the present invention. As shown, profiles A, B, and C are associated with three locations: a first location 401, a second location 402, and a third location 403 within which the wireless device travels. The first location 401 can correspond to a user home, the third location 403 can correspond to a user's office and the second location 402 can correspond to everywhere else, except the first and third locations 401 and 403. When the wireless device 12 is located within the first location 401, it operates in accordance with specified parameters in profile A. While the wireless device 12 is moving from the first location 401 to the third location 403 through the second location 402, it changes its behavior in accordance with specified parameters in profile C. Once the wireless device 12 is in the third location, its operating mode changes again to correspond to specified parameters in profile B. FIG. 5 depicts a table that associates home, office, head office and everywhere else locations with the profiles A, B, and C.

FIG. 6 is a table that defines exemplary profile parameters being associated with the profile A at the home location. At home, the wireless device 12 can be enabled to communicate with certain home devices, such as personal printer, personal computer, but not with neighboring devices, with low level security. FIG. 7 is a table that defines exemplary parameters being associated with the profile B at the office location, where the wireless device can be set to communicate with office printers, network devices, other computers, with moderate level security. However, when the wireless devices is out of the office, the device can be disabled to communicate with peer devices for security reasons and for conservation of resources, and other reasons. FIG. 8 is a table that defines exemplary parameters being associated with the profile C at the second location, which is everywhere else.

FIG. 9 is a flow chart of a communication method between two wireless devices over one or more wireless links in accordance with the present invention. In block 910, the method stores at least one profile associated with a context that defines an operating situation relating to a wireless device. As stated above, the at least one profile is defined by one or more profile parameters that relate to one or more operating modes of the wireless device. The method includes receiving information from at least one other device over the one or more wireless links, block 920. Finally, block 930 shows the step of controlling the operation of the wireless device in accordance with the one or more profile parameters associated with the context.

From the forgoing description it is apparent that the present invention facilitates access to communication services and resources by providing such services based on profiles associated with a context. The profile parameters may be tailored to satisfy various service applications requirements in terms of discoverability, resource sharing, connectivity, security, etc. For example, based on specific requirement of offering communication services in such places as airports, parks, shopping malls, etc., the parameters may be defined to meet various user requirements, for example, based on user age or skills, or even ambient temperature.

What is claimed is:

1. A wireless device that communicates with other devices over one or more wireless links, comprising:

a receiver that receives information from at least one other device over the one or more wireless links;

a controller that controls operational behavior of the wireless device; and a storage device storing at least one profile associated with a context that defines an operating situation relating to the wireless device, the at least one profile being defined by one or more profile parameters that relate to one or more operating modes of the wireless device, wherein the controller controls the operation of the wireless device in accordance with the one or more profile parameters associated with the context, and the operating modes of the wireless device correspond to at least one of a discoverable mode which determines whether the wireless device responds to inquiries and a pairable mode which determines whether the wireless device accepts creation of bonds initiated by the at least one other device.

2. The wireless device of claim 1, wherein the controller changes the operational behavior of the wireless device, when a context parameter changes.

3. The wireless device of claim 2, wherein the context parameter relates to the location of the device.

4. The wireless device of claim 1, wherein the profile parameters enable or disable one or more operating modes of the wireless device.

5. The wireless device of claim 1, wherein the context corresponds to at least one of wireless device location, user age, user skill, user gender, ambient temperature, wireless network connectivity capability, ID and type of "Communicated to" device.

6. The wireless device of claim 1, wherein the at least one other device is at least one of a printer, a network device, and a peer device.

7. The wireless device of claim 1, wherein the storage device stores one or more preset profiles, with settings for some or all parameters, wherein a preset profile can be associated with at least one context by a user.

8. A method of controlling the operational behavior of a wireless device, comprising:

storing at least one profile associated with a context that defines an operating situation relating to the wireless device, the at least one profile being defined by one or more profile parameters that relate to one or more operating modes of the wireless device, wherein the operating modes of the wireless device correspond to at least one of a discoverable mode which determines whether the wireless device responds to inquiries and a pairable mode which determines whether the wireless device accents creation of bonds initiated by at least one other device;

receiving information from the at least one other device over one or more wireless links; and controlling the operation of the wireless device in accordance with the one or more profile parameters associated with the context.

9. The method of claim 8, the operational behavior of the wireless device is changed, when a context parameter changes.

10. The method of claim 9, wherein the context parameter relates to the location of the device.

11. The method of claim 8, wherein the profile parameters enable or disable one or more operating modes of the wireless device.

12. The method of claim 8, wherein the context corresponds to at least one of wireless device location, user age, user skill, user gender, ambient temperature, wireless network connectivity capability, ID and type of "communicated to" device.

13. The method of claim 8, wherein the at least one other device is at least one of a printer, a network device, and a peer device.

14. The method of claim 8 further including the step of storing one or more preset profiles, with settings for some or all parameters, wherein a preset profile can be associated with at least one context by a user.

* * * * *